(12) United States Patent
Krishnaprasad et al.

(10) Patent No.: US 9,794,305 B2
(45) Date of Patent: *Oct. 17, 2017

(54) CONSISTENT MESSAGING WITH REPLICATION

(71) Applicant: Microsoft Technology Licensing, LLC, Redmond, WA (US)

(72) Inventors: Muralidhar Krishnaprasad, Redmond, WA (US); Kartik Paramasivam, Redmond, WA (US); Jayteerth Katti, Redmond, WA (US); Anil Nori, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 66 days.

This patent is subject to a terminal disclaimer.

(21) Appl. No.: 14/084,297

(22) Filed: Nov. 19, 2013

(65) Prior Publication Data

US 2014/0082085 A1 Mar. 20, 2014

Related U.S. Application Data

(63) Continuation of application No. 12/978,336, filed on Dec. 23, 2010, now Pat. No. 8,589,732.

(Continued)

(51) Int. Cl.
*G06F 11/00* (2006.01)
*H04L 29/06* (2006.01)
(Continued)

(52) U.S. Cl.
CPC ........ *H04L 65/403* (2013.01); *G06F 11/1446* (2013.01); *G06F 11/1474* (2013.01); *H04L 51/30* (2013.01)

(58) Field of Classification Search
CPC ............. G06F 11/1446; G06F 11/1464; G06F 11/1474; G06F 11/2094; H04L 12/5875; H04L 51/30; H04L 65/403
See application file for complete search history.

(56) References Cited

U.S. PATENT DOCUMENTS 5,623,599 A * 4/1997 Shomler .......................... 714/18
6,324,654 B1 * 11/2001 Wahl et al. ................... 714/6.12
(Continued)

FOREIGN PATENT DOCUMENTS

| CN | 1589448 A | 3/2005 |
| CN | 101675424 A | 3/2010 |
| CN | 101720478 A | 6/2010 |

OTHER PUBLICATIONS

"GemFire Data Fabric: High Performance, Distributed Main-Memory and Events Platform", Retrieved at << http://www.springsource.com/files/uploads/all/pdf_files/product/S2_Whitepaper_GemFire_USLET_EN.pdf >>, Jul. 21, 2010, pp. 23.

(Continued)

*Primary Examiner* — Marc Duncan
(74) *Attorney, Agent, or Firm* — Dicke, Billig & Czaja, PLLC (57) ABSTRACT

A messaging entity configured in a memory of first node of a plurality communicatively coupled nodes is disclosed. The nodes are included in a distributed computing system. The messaging entity is configured to operate as a secondary messaging entity in a messaging server for the plurality communicatively coupled nodes. The messaging entity is communicatively couple to a primary messaging entity configured in a memory of a second node of the plurality of nodes. The primary messaging entity is configured to store a message; store a copy of the message.

20 Claims, 3 Drawing Sheets

Related U.S. Application Data (60) Provisional application No. 61/406,567, filed on Oct. 25, 2010.

(51) Int. Cl.
  *G06F 11/14* (2006.01)
  *H04L 12/58* (2006.01)

(56) References Cited

U.S. PATENT DOCUMENTS

| | | | |
|---|---|---|---|
| 6,556,586 B1 | 4/2003 | Sipila | |
| 6,885,644 B1 | 4/2005 | Knop et al. | |
| 6,920,476 B2 * | 7/2005 | McGann et al. | 709/201 |
| 8,122,089 B2 | 2/2012 | Kay et al. | |
| 8,185,912 B1 * | 5/2012 | Leonard | 719/314 |
| 8,191,078 B1 * | 5/2012 | Cullen et al. | 719/315 |
| 8,589,732 B2 | 11/2013 | Krishnaprasad et al. | |
| 8,812,897 B1 * | 8/2014 | Helmick et al. | 714/4.11 |
| 2004/0103342 A1 | 5/2004 | Moser et al. | |
| 2004/0167964 A1 | 8/2004 | Rounthwaite et al. | |
| 2005/0160312 A1 | 7/2005 | Seng et al. | |
| 2005/0228867 A1 | 10/2005 | Osborne et al. | |
| 2005/0268146 A1 * | 12/2005 | Jin et al. | 714/2 |
| 2006/0177023 A1 | 8/2006 | Vaghar et al. | |
| 2006/0179147 A1 | 8/2006 | Tran et al. | |
| 2006/0242155 A1 | 10/2006 | Moore et al. | |
| 2006/0271784 A1 | 11/2006 | Bolosky et al. | |
| 2007/0180302 A1 | 8/2007 | Allen et al. | |
| 2007/0204275 A1 | 8/2007 | Alshab et al. | |
| 2007/0214194 A1 | 9/2007 | Reuter | |
| 2007/0245167 A1 | 10/2007 | De La Cruz et al. | |
| 2008/0126832 A1 | 5/2008 | Morosan et al. | |
| 2008/0288646 A1 | 11/2008 | Hasha et al. | |
| 2009/0006564 A1 | 1/2009 | Kay et al. | |
| 2009/0049109 A1 | 2/2009 | Blake et al. | |
| 2009/0100289 A1 * | 4/2009 | Chen et al. | 714/4 |
| 2010/0061252 A1 | 3/2010 | Kini et al. | |
| 2010/0106914 A1 | 4/2010 | Krishnaprasad et al. | |
| 2012/0102355 A1 | 4/2012 | Krishnaprasad et al. | |
| 2012/0110372 A1 | 5/2012 | Borgendale et al. | |
| 2015/0113095 A1 * | 4/2015 | McCabe | G06F 3/0626 709/217 |
| 2017/0104709 A1 * | 4/2017 | Vosshall | H04L 51/30 |

OTHER PUBLICATIONS

"The Spread Toolkit—Overview", Retrieved at << http://www.spread.org/SpreadOverview.html >>, Retrieved Date: Oct. 15, 2010, pp. 1-2.

Okamoto, Russell, "The Hardest Problems in Data Management", Retrieved at << http://www.gemstone.com/assets/23/HardestProblems_update_May5.pdf , pp. 14.

Office Action for U.S. Appl. No. 12/978,336 mailed Mar. 22, 2013 (18 pgs).

Notice of Allowance for U.S. Appl. No. 12/978,336 mailed Jul. 18, 2013 (6 pages).

International Preliminary Report on Patentability for International Application No. PCT/US2011/053529 mailed May 10, 2013 (5 pages).

"International Search Report and Written Opinion", Mailed Date: Apr. 27, 2012, Application No. PCT/US2011/053529, Filed Date: Sep. 27, 2011, pp. 9.

"First Office Action and Search Report Received in Chinese Patent Application No. 201110339396.9", Mailed Date: Nov. 5, 2013, Filed Date: Oct. 24, 2011, 10 Pages.

"Second Office Action Received in Chinese Patent Application No. 201110339396.9", Mailed Date: Dec. 31, 2013, Filed Date: Oct. 24, 2011, 6 Pages.

"Third Office Action and Search Report Received in Chinese Patent Application No. 201110339396.9", Mailed Date: Apr. 17, 2014, Filed Date: Oct. 24, 2011, 14 Pages.

"Supplemental European Search Report Received in European Patent Application No. 11838404.9", Mailed Date: Mar. 12, 2014, Filed Date: Sep. 27, 2011, 7 Pages.

* cited by examiner

CONSISTENT MESSAGING WITH REPLICATION

CROSS-REFERENCE TO RELATED APPLICATIONS

This patent application is a continuation application of U.S. Ser. No. 12/978,336 filed Dec. 23, 2010, entitled "CONSISTENT MESSAGING WITH REPLICATION," which claims priority under 35 U.S.C. §119(e) to U.S. Provisional Patent Application Ser. No. 61/406,567 entitled "CONSISTENT MESSAGING SYSTEM WITH REPLICATION," having a filing date of Oct. 25, 2010, and all of which are incorporated herein by reference.

BACKGROUND

Messaging systems provide basic functionality to store and forward messages between computing devices in a computer network. In the context of computer programming, messaging is used to exchange messages between application components. In one example, a messaging system is implemented in a client-server model.

Messaging servers are often organized in one or both of two patterns including point-to-point messaging and publish-subscribe messaging. The patterns are implemented using a messaging entity, which is a messaging primitive used to receive and distribute message. A queue is an example of a messaging entity that can implement the point-to-pattern. A sender places the messages in the queue until a receiver retrieves them. A topic is an example of a messaging entity that can implement the publish-subscribe pattern. A publisher places messages in the topic and one or more subscribers can consume the message. The patterns often provide an asynchronous communications protocol so that the sender and receiver, or the publisher and subscribers, of the message do not need to interact with the message entity at the same time.

Messaging systems are used to decouple communications between application components and also to connect entities across network boundaries. Thus, application components in distributed computing systems, for example, can reliably exchange data and provide application consistency. Many distributed computing systems, including cloud computing, apply messaging systems to provide a reliable, flexible mechanism for the asynchronous exchange of data and events throughout the network.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one general example, the disclosure is directed to a messaging entity configured in a memory of a first node of a plurality communicatively coupled nodes in a distributed computing system. The messaging entity is configured to operate as a secondary messaging entity in a messaging server for the communicatively coupled nodes. The secondary messaging entity is communicatively coupled to a primary messaging entity configured in a memory of a second node of the plurality of nodes. The primary messaging entity is configured to store a message passed to it from the distributed computing system. The secondary messaging entity is configured to store a copy of the message.

In one example, a messaging server includes a plurality of nodes coupled together with a consistent fabric. Messaging entities are distributed across the nodes in the fabric, such as in separate messaging servers. The messaging entities can be configured as a data structure in the memory of the nodes. A messaging entity configured to provide a process can be designated as a primary messaging entity. Each primary messaging entity corresponds with at least one substantially identical secondary messaging entity also configured to provide the process of the primary messaging entity. For example, if the primary messaging entity is a queue. the secondary messaging entity is also a queue. Further, if the primary messaging entity is a topic, the secondary messaging entity is also a topic. The secondary messaging entities are also distributed across the node in the fabric.

When a message arrives at a primary messaging entity, copies of the message are provided to the corresponding secondary messaging entities. Once a secondary messaging entity receives the message copy, it provides the primary messaging entity an acknowledgement. Once the primary messaging entity receives a selected number of acknowledgements, the message commits and the message is written to the primary messaging entity and the copies are written to the acknowledging secondary messaging entities. Additional replication techniques can be provided to synchronize the primary messaging entity with the corresponding secondary messaging entities. One or more of the messaging entities can be configured to durably write the messages into a storage system located at the nodes or in a shared backend storage system. There is no limit on the number of secondary messaging entities that correspond to a primary messaging entity, but increasing the number of secondary messaging entities increases consistency at the expense of increasing the potential for latency.

In some examples, the messaging server can include a plurality of distributed primary messaging entities each having at least one corresponding secondary entities. Generally, the primary messaging entities will be configured on separate nodes. The nodes may also host secondary messaging entities not corresponding with each other or the co-located primary messaging entity or entities. In the case where the failed node also includes a secondary messaging entity, the fabric can create a new secondary messaging entity on a node not already having a corresponding messaging entity.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
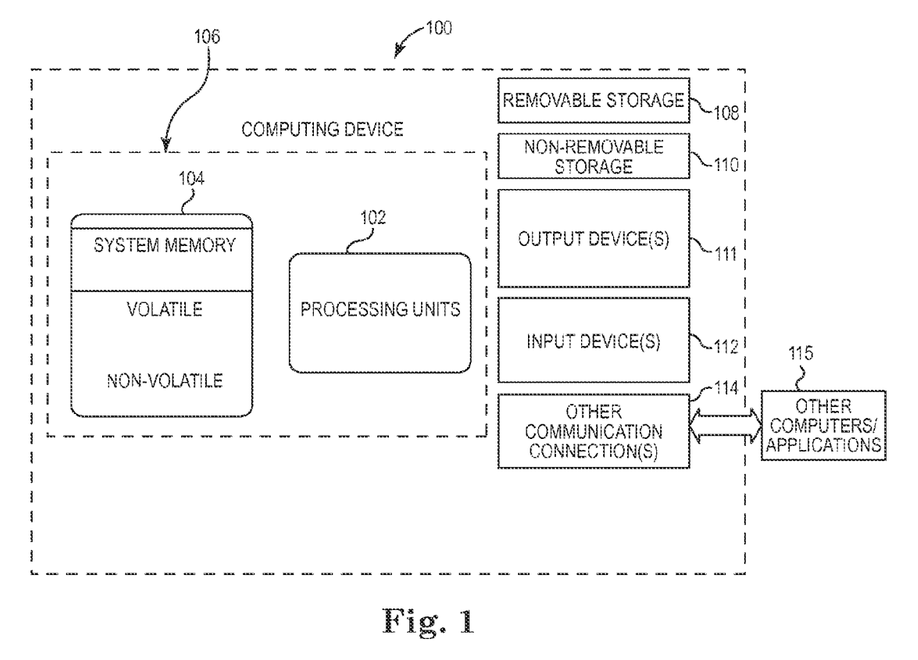
FIG. 1 is a block diagram illustrating an example computing device.

FIG. 1 illustrates an exemplary computer system that can be employed as a component in an operating environment such as a distributed computing system or other form of computer network. Computer systems can be used to run a messaging server and be coupled to computer systems running client applications.

The exemplary computer system includes a computing device, such as computing device 100. In a basic configuration, computing device 100 typically includes a processor system having one or more processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. An example communication connection can be an Ethernet interface. In some examples, the computing device can also have one or more additional processors or specialized processors (not shown) to perform processing functions offloaded from the processor 102. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. The managed environment typically includes pre-coded solutions to common programming problems to aid software developers to create software programs, such as applications, to run in the managed environment.

A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a thread identifier, and a thread context (or thread state) until the thread is scheduled. A thread context includes the thread's set of machine registers, the kernel stack, a thread environmental block, and a user stack in the in the address space of the process corresponding with the thread. In parallel applications, threads can be concurrently executed on the processor 102.

Figure 2:
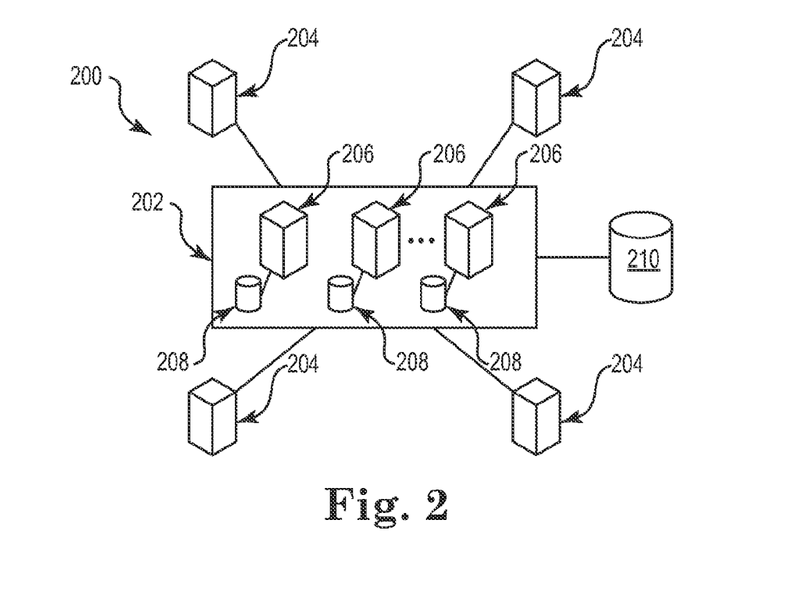
FIG. 2 is a schematic diagram illustrating an example of a messaging system that is implemented as network of computing devices that include features of the computing device of FIG. 1.

FIG. 2 illustrates an exemplary messaging system 200 including a messaging server 202 communicatively coupled to a plurality of distributed clients/services 204. The messaging system 200 can be implemented as a computer network to provide for distributed computing and include features of a cluster, grid, cloud, or the like. The messaging server 202 can be implemented on a sub-network of a plurality of distributed nodes 206, each of which can incorporate features of computing device 100. The clients 204 also can be implemented on computing devices incorporating features of the computing device 100. One possible communication between a client 204 and the server 202 can include transmitting a computer data packet between two or more computer processes over a communication framework coupling the server 202 to the clients 204.

In one example, each client 204 can include an application component such as one or more processes, objects, or the like. The messaging server 202 provides message exchanges between application components. The clients 204 can assume roles of senders, receivers, publishers, subscribers, and the like depending on the configuration of distributed application components. The messaging server 202 can include at least one messaging entities, such as queues for point-to-point messaging patterns or topics for publisher-subscriber messaging patterns. In some examples, a topic can include a subscription to filter messages. For example, client-side subscriptions directly read messages from a topic by maintaining a last message sequence number on the client side. Often, the messaging server 202 includes two or more dissimilar messaging entities, such as two queues, a queue and a topic, and the like. Messages that flow through the system 200 are typically durably recorded to local storage systems 208 located at the nodes 206 or to a backend remote storage system 210 to preserve the state in case of node failures or other service interruptions.

The recovery of durably recorded messages imposes latencies that negatively affect performance of the messaging system 200. Typical solutions used to reduce latencies involving caching of messages or in-memory queues and topics, which decrease consistency if these messages are lost or corrupted. In cases of node failure or service interruptions, the in-memory messaging state is recreated from a durable storage with a time consuming process that also negatively affects system performance. Further, if device failures occur before messages can be durably recorded, the messages will be lost.

Figure 3:
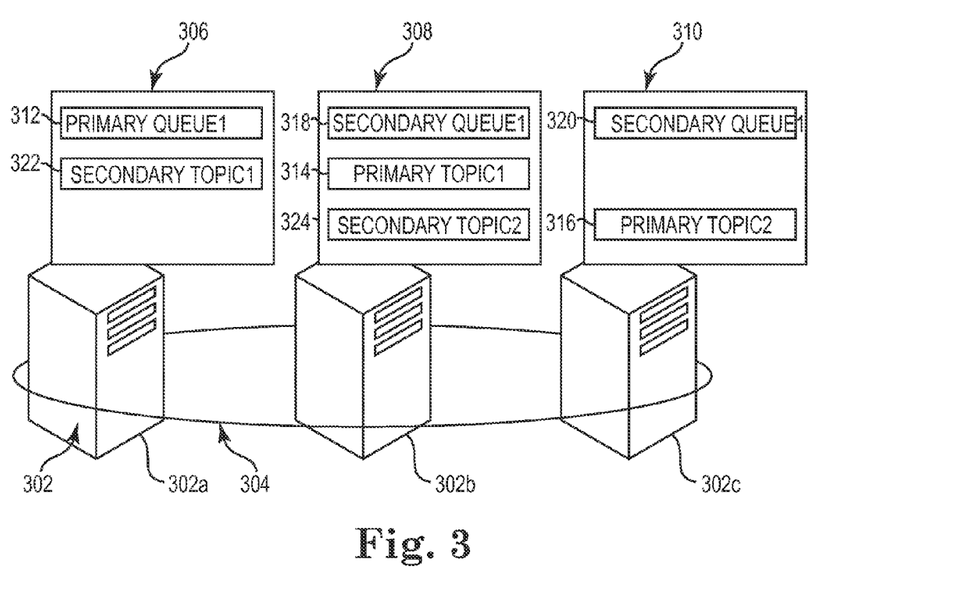
FIG. 3 is a schematic diagram illustrating an example of a messaging server, for use in the messaging system of FIG. 2, that is implemented as a network of computing devices that each can include features of the computing device of FIG. 1.

FIG. 3 illustrates an example distributed messaging server 300 incorporating features of messaging server 202. The messaging server 300 includes a plurality of nodes 302 (such as computing devices 302a, 302b, and 302c) coupled together with a consistent fabric. The consistent fabric can include a plurality of hardware devices, such as computing devices and communication devices (e.g. routers, repeaters, etc.) and a software component such as a fabric layer 304. A plurality of messaging entities are distributed on the nodes 302. A messaging entity configured to provide a selected process can be designated as a primary messaging entity. Each primary messaging entity corresponds with at least one generally identical secondary messaging entity. The secondary messaging entities are also distributed on at least some of the nodes 302 other than the node including the primary messaging entity.

When the number of nodes is limited or the number of primary messaging entities is large, each node 302 can includes a plurality of co-located messaging entities that can form a messaging entity set. For example, the memories of computing devices 302a, 302b, 302c each include a plurality of messaging entities that are arranged as messaging entity sets 306, 308, 310, respectively. In the example, primary queue1 312, primary topic1 314, and primary topic2 316 are distributed across the messaging entity sets 306, 308, 310, respectively. The primary messaging entities in this example are configured to receive writes from senders or publishers and are typically configured to allow reads from receivers and subscribers.

Each message in a primary messaging entity is replicated into the corresponding secondary messaging entity. For example, the messages in primary queue1 312 are replicated into a plurality of secondary queue1 included in messaging entities 318, 320. The messages of primary topic1 314 are replicated into secondary topic1 322, and the messages in primary topic2 316 are replicated into secondary topic2 324. As described below, the fabric layer 304 can further synchronize the messages in the secondary messaging entities with the messages in their corresponding primary messaging entities.

In the example, each messaging entity is included in the memory of the corresponding node 302. For example, the messaging entity can be configured as a data structure in the memories of the nodes. Messages stored in memory provide for reduced latency over messages accessed from storage systems, and in memory message replication increases consistency.

In the case of a failure of a computing device including a primary messaging entity, the fabric layer 304 will promote a corresponding secondary messaging entity to a new primary messaging entity. The new primary messaging entity resumes the operations without losing of data or consistency and without significant latency, if any, affecting the performance of the server 300. In the case where the failed node includes a secondary messaging entity, the fabric can create a new secondary messaging entity in a messaging entity set not including either the corresponding primary messaging entity or any of its corresponding secondary messaging entities. The replication of data in primary messaging entities and in-memory storage architecture remarkably improves consistency and reduces latency over prior solutions.

The fabric layer 304 maintains consistency of placement of the messaging entities and replication of the messaging entities across a set of processes distributed over the memory server 300. The fabric layer 304 can include a plurality of partitions, and each partition is a consistency unit maintained in the fabric layer 304. A partition can be a primary partition or a secondary partition. A primary partition includes a primary messaging entity and is maintained by a computing device configured to process all writes to the partition. A secondary partition includes a secondary messaging entity and is maintained by a computing device, which typically is not configured to process writes.

The fabric layer 304 is configured to maintain knowledge of the nodes in the memory server and the messaging entities and participates in the lifecycle of the data stored in the messaging entities. The fabric layer 304 can include resources and applications, and provide scheduling, resource allocation, device management, and fault tolerance for the nodes in the distributed computing system. The fabric layer can also provide high-level application models for intelligently managing the complete application lifecycle, including deployment, health monitoring, upgrades, and deactivation.

One example of a suitable fabric layer 304 is available as a platform as a service (PaaS) that can be hosted at a backend datacenter and be controlled with the operating system. An example operating system is available under the trade designation of Windows Azure, from Microsoft, Inc., of Redmond, Wash., U.S.A.

Figure 4:
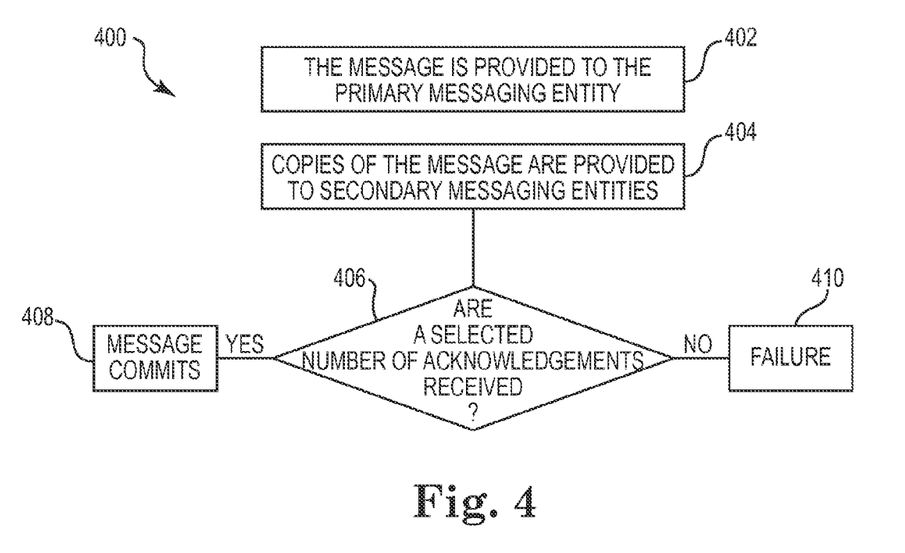
FIG. 4 is a block diagram illustrating an example method for use with messaging server of FIG. 3.

FIG. 4 illustrates an example method 400 for handling messages that will be written to a particular message entity in the context of the messaging server 300. The messaging server 300 receives the message from a client and determines which messaging entity on the messaging server 300 is assigned to process the message. The message is then provided to the primary messaging entity of the assigned messaging entity at 402. For example, a message assigned to queue1 for processing is provided to primary messaging entity queue1 312.

Copies of the message are provided to corresponding secondary messaging entities at 404. For example, copies of the message assigned to queue1 312 are provided to the secondary queue1 318 and secondary queue1 320. Each secondary messaging entity that is able to receive the copy of the message provides an acknowledgement to the primary messaging entity. Once the primary messaging entity receives a selected number of acknowledgements or more from the secondary messaging entities at 406, the message commits. In the example of the write operation, the message is written to the primary messaging entity and the copies are written to the corresponding secondary messaging entities that provided acknowledgement at 408. The messaging server 300 can provide an acknowledgement to the client that the message has committed, and the message will be processed according to the function of the messaging entity. If the primary messaging entity receives less than the selected amount of the acknowledgements, the write operation is aborted, rolled back, or otherwise indicated as failed at 410. In some cases, the message server 300 can then apply a retry policy.

In the case when the write is included as part of a transaction, the transaction is not committed until the secondary messaging entities provide the selected number of acknowledgements. When multiple writes are included in the transaction, just the transaction commit can wait for the selected number of acknowledgments in order to reduce latency for operations within the transaction.

The selected number of acknowledgments can be set to one or more acknowledgements or be based on a quorum of secondary entities selected to receiving the copies of the message. Examples of quorum-based selected numbers can be equal to a majority quorum, a full quorum, or other quorum-based amount. A relatively high selected number can enhance consistency but also increase latency, and relatively low selected number can reduce latency but also reduce consistency. Thus, the selected number can be chosen to benefit one concern one at the expense of the other or to balance the competing concerns. For example, setting the selected number to approach or include a full quorum can increase longer-term reliability while decreasing throughput and/or negatively affecting latency, as the messaging entities can wait longer for the write to commit. Regardless of the potential for longer-term reliability, data can be lost if secondary messaging entities fail while waiting for the acknowledgments to commit the write.

In one example, the primary messaging entity can be configured to wait to receive the selected number of acknowledgements for a predetermined amount of time or event at 406 before the messaging server declares failure at 420. As part of a retry policy, the primary messaging entity can check to determine whether the non-responding secondary messaging entities are known to be down. The primary messaging entity can check to determine whether the nodes hosting the secondary messaging entities are known to be down. If either or both the secondary messaging entities or the hosting nodes are down, the primary can determine to not resend the copies of the message.

The fabric layer 304 is configured for messaging operations in addition to write operations. Read operations can be sent to the primary messaging entity in typical situations, although reads can be sent to one or more secondary messaging entities to avoid latency in case the primary messaging entity is processing another operation or in situations where the sheer number of subscriber reads would overwhelm a single messaging entity. Send operations and delete operations can be treated as write operations and follow a similar process as method 400. Receive operations on a queue or subscriptions are often destructive or use peek-lock and delete semantics. Destructive receives and deletes can be treated in similar manner as writes in method 400. Peek-locks are typically not provided to the secondary messaging entities because a peek-lock is an optimistic lock on the messaging object with a timeout. Accordingly, a peek-lock can be treated in a manner similar to read operations described above. In cases where locks are lost due to node failure or otherwise, the locks can be obtained again in a manner similar to situations when a lock expires due to inactivity. Still further, browse operations on queues, topics and subscriptions can be treated similar to read operations.

In cases where messages can be committed with less than a full quorum of acknowledgements, some secondary messaging entities may not be synchronized with the primary messaging entity and can include less than a complete set of committed messages. To address this possibility, the messaging server 300 can support duplication detection logic that includes a mechanism to help the secondary messaging entities remain synchronized with the corresponding primary messaging entity.

For example, messaging entities can be implemented as a combination of a log with sequence numbers and a cursor that stores state of deleted message identifiers and points to the next message to be read from the log. The cursor typically holds non-reliable states, such as peek-locks, that are not replicated and reliable states that are replicated. The secondary messaging entities can each maintain a history table including previous message sequence numbers of the messages that have been stored in the secondary messaging entity. The distributed computing system (for example, the fabric layer) can be configured to store committed messages that correspond to just the latest sequence numbers. This information can be periodically passed through the fabric layer as control information to enable the secondary messaging entities to flush their history tables. In addition to decreasing the amount of copying and processing involved, this mechanism also improves replication throughput because the replication subsystem does not send and receive messages in a sequential order so replication can be parallelized.

Messages can have time-to-live semantics that cause the message to expire after the time-to-live has passed. Distributed systems such as the messaging server 300, however, typically do not include nodes having synchronized clocks, and this can cause disparate expiration times of the messages distributed across the primary messaging entity and the secondary messaging entities. To address this issue, the time-to-live value of a message under replication can be adjusted to a relative value that describes the remaining time left on the message. The message time-to-live can be adjusted to be a relative value equal to the actual time-to-live of the message minus the current time in the secondary messaging entity. Upon committing the message, the relative time-to-live is converted back to absolute time-to-live. Additionally, average time of transfer can be used to fine-tune the message time-to-live at the destination to account for the network transfer time. Expired messages can be excluded from replication to reduce replication traffic.

Figure 5:
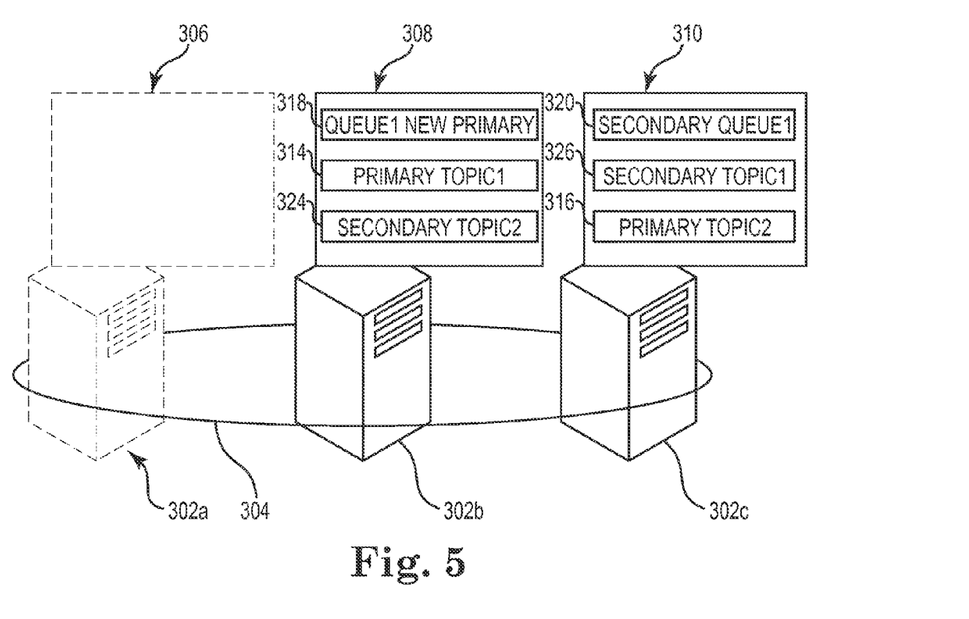
FIG. 5 is a schematic diagram illustrating the messaging server of FIG. 3 after a device failure.

FIG. 5 illustrates an example result of a failover process for the messaging server 300 configured for the event of a failure or crash of node 302a. The messaging server 300 can be configured with failover processes corresponding to permutations of failures of a node 302 or messaging entities 312-324. Failover processes configured prior to the failure can reduce latency but can also create overhead as compared to failure processes configured in response to the failure. Data stored in primary queue1 312 and secondary topic1 322, which were included in the memory of device 302a as illustrated in FIG. 3, are lost due to the failure. The failover process quickly promotes secondary queue1 318 on device 302b to become a new primary messaging entity for data lost from failed primary queue1 312. Primary topic1 314 has lost its one secondary topic1 322, so a new secondary topic1 326 can be created on a node that does not include the primary messaging entity or a corresponding secondary messaging entity, such as device 302c. In the case where a failed node is restored or brought back online, the local storage system 208 may already include a durable store of the local state.

The fabric layer 304 can select whether to resurrect the device 302a to include a primary messaging entity or just secondary messaging entities until the complete state is restored. The duplicate detection logic described above can be used to identify messages that have not been durably stored in the case of a failover process where a secondary messaging entity becomes a primary messaging entity.

Messages can also be written to durable storage to further improve reliability of the system. Two example of durable storage include a remote, or backend, shared storage, such as remote storage system 210 in messaging system 200 and local storage systems 208. The messaging server 300 can be configured to periodically write messages from the primary messaging entity to the shared remote storage system 210 during idle system cycles or at another specified time. In most circumstances, durable writes do not occur during replication. In addition to the write to remote storage system 210, or at times instead of the write to remote storage system 210, the messaging server 300 can be configured to periodically write messages from messaging entities to local storage systems 208 during idle system cycles or at another specified time. In one example, the secondary messaging entity writes to the local store 208 or the remote storage system 210 instead of or addition to the corresponding primary messaging entity writing to the local store 208 or the remote storage system. The server 300 can durably store selected secondary messaging entities on each node to reduce the overall memory requirements of the computing nodes 302. The duplicate detection logic described above can also be applied to writes to storage systems 208, 210.

Other factors may determine when the messaging entities write to storage. For example, the memories of the entities can become full or reach of quota of size or number of messages, which would trigger a write to durable store. Also, memories entities can write to durable store after a selected period of time has elapse. Still further examples are contemplated.

In cases where the queue or topic includes a main log store as part of the messaging system, the main log store can act as a write-behind queue to the local storage system 208. Once a message is written to a durable storage, it can be evicted from the primary and secondary messaging entities. In order to reduce memory requirements, an empty messaging entity, i.e., a messaging entity that has evicted all messages, can itself be evicted from the memory and can be resurrected when required.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A messaging entity configured in a memory of first node of a plurality communicatively coupled nodes of a distributed computing system and configured to:
   operate as a secondary messaging entity in a messaging server for the plurality communicatively coupled nodes including a plurality of secondary messaging entities;
   communicatively couple to a primary messaging entity configured in a memory of a second node of the plurality of nodes, the primary messaging entity is configured to receive a message;
   provide an acknowledgement to the messaging server upon receipt of a copy of the message prior to storing the copy of the message if the secondary messaging entity is able to store the copy of the message; and
   store the copy of the message in the memory of the first node to synchronize the store of the copy of the message with a store of the message in the memory of the second node upon confirmation from the primary messaging entity of the primary messaging entity receiving a selected number of acknowledgements from the plurality of secondary messaging entities, the selected number of acknowledgements selected to balance enhancing consistency and reducing latency.

2. The messaging entity of claim 1 wherein the messaging entity is one of a messaging queue and a messaging topic.

3. The messaging entity of claim 1 and configured to receive the copy of the message and send an acknowledgement to the primary messaging entity prior to storing the copy of the message.

4. The messaging entity of claim 1 and configured to subsequently write the message to another storage device during an idle period of the primary messaging entity.

5. The messaging entity of claim 4 wherein the message is evicted from the primary messaging entity and the secondary messaging entity after it has been written to the another storage device.

6. The messaging entity of claim 1 and wherein the primary messaging entity is configured to receive all write requests from a client in the distributed computing system.

7. The messaging entity of claim 6 wherein one of the primary messaging entity and the secondary messaging entity are configured to receive corresponding read requests from the client.

8. The messaging entity of claim 1, wherein the selected number includes less than a full amount of the plurality of secondary messaging entities.

9. A secondary messaging entity in a distributed computing system having a plurality of nodes and a plurality of secondary messaging entities, the secondary messaging entity communicatively coupled to a primary messaging entity configured to receive a message, the secondary messaging entity configured to:
   provide an acknowledgement upon receipt of a copy of the message prior to storing the copy of the message if the secondary messaging entity is able to store the copy of the message in a first node of the plurality of nodes; and
   store the copy of the message in the first node to synchronize the store of the copy of the message with a store of the message in a second node of the plurality of nodes upon a confirmation from the primary messaging entity of the primary messaging entity receiving a selected number of acknowledgements from the plurality of secondary messaging entities, the selected number of acknowledgements selected to balance enhancing consistency and reducing latency.

10. The secondary messaging entity of claim 9 wherein the secondary messaging entity is configured in the first node.

11. The secondary messaging entity of claim 9 wherein the first node includes a memory configured to store the copy of the message.

12. The secondary messaging entity of claim 11 wherein the first node is communicatively coupled to a storage device and configured to store the copy of the message in a durable storage device.

13. The secondary messaging entity of claim 9 wherein the acknowledgement is provided to the primary messaging entity.

14. The secondary messaging entity of claim 9 wherein the confirmation of acknowledgement is received at the secondary messaging entity.

15. A messaging server configured in a plurality of nodes of a distributed computer system, the messaging server comprising
- a primary messaging entity configured in a first node of the plurality of nodes, wherein the primary messaging entity is configured to store a message;
- a plurality of secondary messaging entities including a secondary messaging entity configured in a second node of the plurality of nodes, the secondary messaging entity is configured to store a copy of the message;
- wherein the messaging server is configured to receive an acknowledgement in response to receipt of the copy of the message prior to the secondary messaging entity storing the copy of the message if the secondary messaging entity is able to store of the copy of the message;
- wherein the secondary messaging entity stores the copy of the message to synchronize the store of the copy of the message with the message being stored by the primary messaging entity upon confirmation from the primary messaging entity of the primary messaging entity receiving a selected number of acknowledgements from the plurality of secondary messaging entities, the selected number of acknowledgements selected to balance enhancing consistency and reducing latency.

16. The messaging server of claim 15 wherein the primary messaging entity is configured to store the message in a memory of the first node.

17. The messaging server of claim 15 wherein secondary messaging entity is configured to store the copy of the message in a memory of the second node.

18. The messaging server of claim 15 wherein the primary messaging entity is configured to receive the acknowledgement.

19. The messaging server of claim 15 wherein the secondary messaging entity is configured to send the acknowledgement.

20. The messaging server of claim 15 wherein the primary and secondary messaging entities are both topics or both queues.

\* \* \* \* \*